Oct. 3, 1939.　　　H. C. HUEGLIN　　　2,174,747
CEILING MOUNTING FIXTURE
Filed Dec. 30, 1936
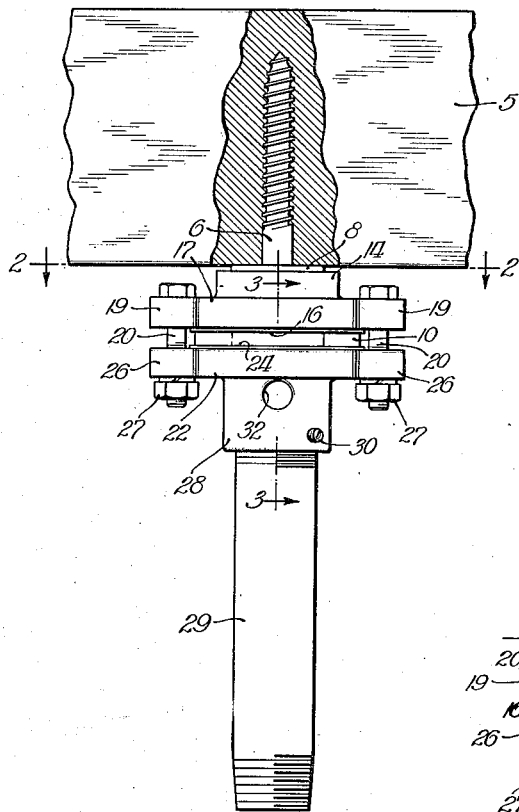
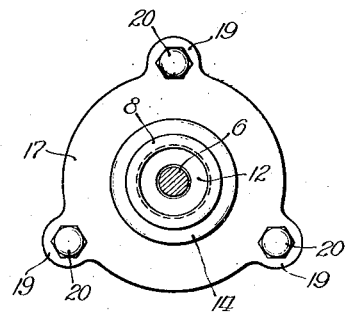
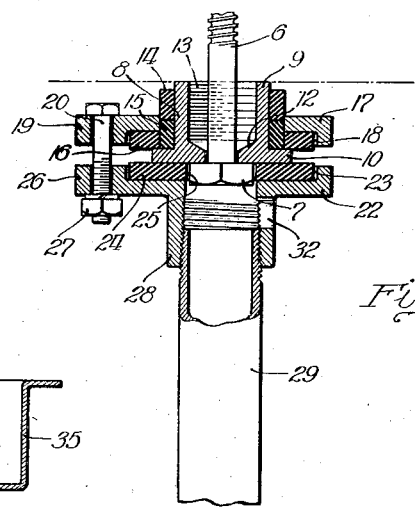
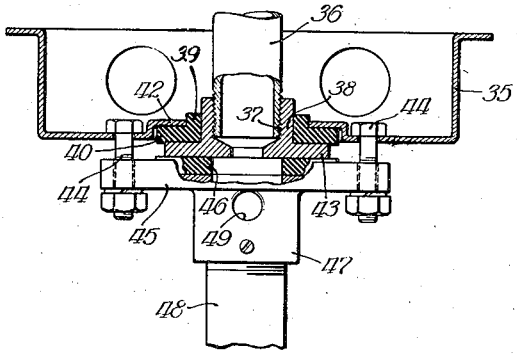
Inventor:
Herman C. Hueglin
By:
Attys.

Patented Oct. 3, 1939

2,174,747

UNITED STATES PATENT OFFICE 2,174,747

CEILING MOUNTING FIXTURE

Herman C. Hueglin, Chicago, Ill., assignor to Airmaster Corporation, Chicago, Ill., a corporation of Illinois Application December 30, 1936, Serial No. 118,289

2 Claims. (Cl. 248—343)

This invention relates to ceiling mounting fixtures, and more particularly is directed to fixtures adapted for suspending electric fans, lights and similar fixtures from the ceilings of rooms or other enclosures.

The invention is particularly adapted for suspending devices such as fans or the like from the structural portions of ceilings in a manner such as to reduce and substantially eliminate vibration and noise.

It is a primary object of the present invention to provide a ceiling mounting comprising a bracket assembly which, in addition to imparting to the mounting the requisite strength for mechanically supporting the fixture, also provides a resilient non-metallic assembly that eliminates the transmission of any noise or vibration therethrough.

The present invention contemplates employing a bracket member which is rigidly connected to some portion of the ceiling structure or to a rigid portion of a wiring system such as an anchored conduit or outlet box, and a fixture supporting portion clamped to the bracket member through resilient non-metallic cushioning means, whereby no vibration or noise can be transmitted through the clamping connection.

In the preferred form of the invention, I preferably employ cushioning and mechanical insulating members formed of rubber or equivalent material and so arranged with respect to the bracket member and fixture supporting portion as to prevent any metal to metal contact therebetween.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is an elevational view, partly in section, showing the manner of mounting the structure in a ceiling;

Figure 2 is a sectional view taken substantially on the line 2—2 of Figure 1;

Figure 3 is a sectional view taken substantially on the line 3—3 of Figure 1; and Figure 4 is a view partly in section, showing a modified manner of mounting the assembly.

Referring now in detail to the drawing, in Figure 1 I have shown a ceiling structural member 5, which may be a beam, girder or the like, which is adapted to receive the lag screw 6 having the headed end portion 7 as shown in Figure 3. The screw is threaded into the member 5, to rigidly secure it in position.

The shank portion of the screw is adapted to receive the bracket member 8, which comprises the cylindrical portion 9 and the radially extending flange portion 10 disposed at the lower end of the bracket 8 and having the inwardly extending portion 12 adapted to closely encircle the shank of the screw 6, whereby the bracket member 8 is supported by the head 7 of the screw. The bracket member is preferably internally threaded, as indicated at 13, for a purpose to be hereinafter disclosed.

Surrounding the bracket member 8, I provide resilient cushioning rings 14 and 15, which may be formed of rubber or other resilient non-metallic material, and which closely fit the external peripheral surface of the cylindrical portion 9 of the bracket. The bracket is also provided with the annular member 16, engaging one face of the flange 10, which is formed of material similar to that forming the members 14 and 15, and which projects outwardly beyond the radial extent of the flange 10.

Encircling the bracket 8 is a plate member 17, this member having an enlarged central aperture which fits about and engages the outer peripheral surface of the cushioning rings 14 and 15. The member 17 is recessed on its lower surface, as indicated at 18, whereby it fits over and is centered about the cushioning ring 16. It is thus apparent that the member 17 is insulated with respect to the bracket 8, there being no possibility of metal to metal contact therebetween. The member 17 is also provided with a series of peripherally spaced ears or lug portions 19 adapted to receive the bolts 20 which have the head portions thereof disposed in abutment with the upper surface of the plate 17.

Disposed below the plate 17 is a second plate member 22, having a recess in the upper face thereof adapted to receive the annular cushioning member 24, which may be formed of material similar to that forming the members 14, 15 and 16, and which is provided with a central aperture 25 adapted to fit about the head portion 7 of the lag screw 6. The member 22 is correspondingly provided with a plurality of lugs 26 through which the threaded ends of the bolts 20 extend, whereby upon threading of the nuts 27 over the projecting ends of these bolts, the member 26 is securely clamped to the member 19, thereby compressing the members 16 and 24 upon opposite faces of the flange 10, and also insuring that there will be no metal to metal contact between the bracket 8 and either of the members 17 or 22.

The member 22 is provided with a downwardly extending socket portion 28, which is interiorly threaded to receive the threaded end of the fixture supporting conduit 29, which may be a pipe or any similar member, adapted to be threaded into the lower end of the socket 28 to be thereby rigidly secured therein.

I preferably provide the set screw 30 for locking the member 29 in fixed position within the socket portion 28 of the member 22, and also provide this socket portion 28 with the laterally extending opening 32 whereby electrical conductors may be led into and out of the pipe 29 and the interior of the socket 28.

It will be apparent, from the device as thus far described, that no metal to metal contact between the rigidly mounted supporting member and the fixture supporting means is provided by the present construction, and the non-metallic cushioning means between the various parts of the assembly insures that no noise or vibration will be transmitted from the fixture carried by the portion 29 of the assembly to the supporting bracket 8. Further, by this resilient mounting, slight differences in alignment may be accommodated due to the compressibility of the material forming the cushioning means.

In the embodiment of the invention disclosed in Figure 4, I provide an outlet box 35, which may be secured to the ceiling structure or the like, and which preferably includes a conduit member 36, which may be the elbow of the end of a conduit leading into the outlet box for leading conductors therein, having the threaded end 37 adapted to be received in the threaded end portion of a bracket member 38 corresponding to the bracket member 8 of Figures 1 and 3. The bracket member 38 is provided with an encircling cushioning member 39, having the radially extending flange portion 40 which is adapted, upon its upper face, to engage a recessed portion 42 of the outlet box 35, while resting against the upper face of the flange portion 43 of the bracket 38. This insulates the bracket 38 and the conduit 36 from the outlet box, the cushioning member 40 providing a non-metallic resilient spacing therebetween.

The outlet box is suitably apertured to receive the bolts 44, which are adapted to extend downwardly through suitable openings formed in the member 45, corresponding to the member 22 of Figures 1 and 3, the member 45 being provided with a recess in its upper face adapted to receive the cushioning member 46 corresponding to the member 24 of Figure 3. The member 45 is provided with a downwardly extending socket portion 47 adapted to receive the upper end of the fixture supporting pipe 48, which is secured thereto in the same manner as described in connection with Figure 3.

It will be apparent that in the construction shown in Figure 4, electrical conductors being led into the outlet box through the conduit 36 may be carried down through the opening in the bracket member 38 and into the interior of the member 45, being thence either led out through the opening 49 in the socket portion 47 thereof, or being led through the pipe 48 to any suitable fixture, such as a fan or the like, mounted at the lower end of the pipe. By means of the cushioning members 40 and 46, I am able to prevent any metal to metal contact between the bracket 38 and either the outlet box 35 or the plate member 45, thereby insuring that no transmission of noise or vibration from the fixture carried by the pipe 48 will be transmitted to the conduit 36 or to the outlet box. This is of distinct advantage when fans or other revolving mechanisms are provided at the lower end of the mounting, since it enables the mounting to be employed to prevent the transmission of noise or vibration through a ceiling structure, or to any equivalent supporting structure.

I am aware that in place of using the three elements, 14, 15 and 16, as cushioning means in Figure 1, a single molded member might be employed, substantially in the manner shown in Figure 4, and intend that the present invention shall not be limited to the specific constructions shown and described in connection with the illustrated embodiments thereof, but only insofar as defined by the scope and spirit of the appended claims.

I claim:

1. In a ceiling mounting fixture, an overhead support, a rigid hanger member supported in position suspended from said support and having an outwardly extending flange at its lower end, resilient plastic cushioning means disposed on the upper face of said flange and extending up about the hanger member, a plate member encircling the upwardly extending portion of said cushioning means and supported on said flange by the cushioning means on the upper face thereof, a fixture supporting member disposed beneath the lower face of said flange and spaced below said plate member, resilient plastic cushioning means spaced below said first cushioning means and disposed between said fixture supporting member and the lower face of the flange on said hanger member, a fixture supporting conduit having threaded engagement directly with said fixture supporting member and suspended therefrom, said fixture supporting member having an opening extending laterally through the wall thereof above the upper end of said fixture supporting conduit for leading electric conductors into and out of the fixture supporting member, and a plurality of circumferentially spaced bolts cooperating directly with said plate member and with said fixture supporting member for drawing said members against the cushioning means on the upper and lower faces of the flange on said hanger member and operable throughout their full force to vary the compression on said cushioning means.

2. In a ceiling mounting fixture, a depending conduit, a hanger member having threaded engagement with the lower end of said conduit, said hanger member having an outwardly extending flange at its lower end, an outlet box having an opening receiving said hanger member and a bottom wall overlying said flange, resilient plastic cushioning means between the defining edge of said opening and said hanger member, a fixture supporting member in alignment with said hanger member, resilient plastic cushioning means between the top of said flange and the bottom of the outlet box and between the bottom of said flange and said fixture supporting member, and means cooperating directly with the bottom of the outlet box and with the fixture supporting member for clamping said fixture supporting member to said box with the cushioning means compressed against the top and bottom of the flange, said last means being operable through its full force to vary the compression upon said cushioning means.

HERMAN C. HUEGLIN.